United States Patent [19]

Fite et al.

[11] Patent Number: 5,557,721
[45] Date of Patent: Sep. 17, 1996

[54] METHOD AND APPARATUS FOR DISPLAY SCREENS AND COUPONS

[75] Inventors: Kenneth R. Fite, San Diego, Calif.; Bruce R. DeWoolfson, Fairfax, Va.

[73] Assignee: Environmental Products Corporation, Fairfax, Va.

[21] Appl. No.: 107,599

[22] Filed: Aug. 18, 1993

Related U.S. Application Data

[63] Continuation-in-part of Ser. No. 517,207, May 1, 1990, abandoned.

[51] Int. Cl.[6] ............................... G06F 13/00; G06T 1/00
[52] U.S. Cl. ............... 395/148; 395/200.09; 395/200.18
[58] Field of Search .................................. 395/144, 145, 395/147, 148, 152, 153, 162, 200.09, 200.18; 348/469, 232, 3, 7–10; 364/401, 408

[56] References Cited

U.S. PATENT DOCUMENTS

| | | | |
|---|---|---|---|
| 2,811,583 | 10/1957 | Timms et al. | 179/2 |
| 3,469,668 | 9/1969 | Bottling | 194/13 |
| 4,412,292 | 10/1983 | Sedam et al. | 364/479 |
| 4,559,536 | 12/1985 | Olsesen et al. | 340/825.07 |
| 4,592,012 | 5/1986 | Braun | 364/900 |
| 4,625,275 | 11/1986 | Smith | 364/401 |
| 4,630,042 | 12/1986 | Kawasaki et al. | 340/825.35 |
| 4,674,041 | 6/1987 | Lemon et al. | 364/401 |
| 4,677,565 | 6/1987 | Ogaki et al. | 364/479 |
| 4,766,548 | 8/1988 | Cedrone et al. | 364/479 |
| 4,780,599 | 10/1988 | Baus | 235/383 |
| 4,821,291 | 4/1989 | Stevens et al. | 375/37 |
| 4,833,308 | 5/1989 | Humble | 235/383 |
| 4,879,756 | 11/1989 | Stevens et al. | 455/39 |
| 4,937,586 | 6/1990 | Stevens et al. | 343/702 |
| 5,233,423 | 8/1993 | Jernigan et al. | 358/181 |
| 5,295,064 | 3/1994 | Malec et al. | 364/401 |
| 5,361,091 | 11/1994 | Hoarty et al. | 348/7 |

FOREIGN PATENT DOCUMENTS

| | | |
|---|---|---|
| 0167072 | 1/1986 | European Pat. Off. . |
| 2604315 | 3/1988 | France . |
| 83/00251 | 1/1983 | WIPO . |
| WO86/03310 | 6/1986 | WIPO . |
| 86/03310 | 6/1986 | WIPO . |
| 88/06773 | 9/1988 | WIPO . |
| 91/05316 | 4/1991 | WIPO . |

OTHER PUBLICATIONS

"1600 afficheurs: les faire tous dialoguer", 599, Bureaux d'Etudes Automatismes No. 39, Dec. 1987, Paris FR, pp. 41–42, Jean–Francois Desclaux.

*Primary Examiner*—Mark K. Zimmerman
*Assistant Examiner*—Joseph H. Feild
*Attorney, Agent, or Firm*—Finnegan, Henderson, Farabow, Garrett & Dunner, L.L.P.

[57] ABSTRACT

A method and apparatus for displaying advertisements and printing coupons on remote systems of a distributed data processing system. A host system downloads display files, command file and transaction files describing the advertisements to be displayed and coupons to be printed to a remote system. The remote system keeps statistics on the number of times each advertisement is displayed and the number of times each coupon is printed, and periodically relays these statistics to the host system.

15 Claims, 12 Drawing Sheets

FIG. 2

| TABLE NAME : | SITE_FILES | | |
|---|---|---|---|
| COLUMN NAME | TYPE | SIZE | DESCRIPTION |
| FILE_ID | INT | 9 | THE INTERNAL TRACKING IDENTIFIER OF THIS FILE |
| PATH | CHAR | 80 | THE FULLY QUALIFIED DOS PATH WHERE THIS FILE RESIDES AT THE SITE |
| FILE_NAME | CHAR | 12 | THE NAME OF THE FILE AS IT APPEARS IN THIS DIRECTORY |

FIG. 3

| TABLE NAME : | HOST_FILES | | |
|---|---|---|---|
| COLUMN NAME | TYPE | SIZE | DESCRIPTION |
| FILE_ID | INT | 9 | THE INTERNAL TRACKING IDENTIFIER OF THIS FILE |
| PATH | CHAR | 80 | THE FULLY QUALIFIED DOS PATH WHERE THIS FILE RESIDES AT THE HOST |
| FILE_NAME | CHAR | 12 | THE NAME OF THE FILE AS IT APPEARS IN THIS DIRECTORY |

FIG. 4

| TABLE NAME: | FILE_DISTRIBUTION | | |
|---|---|---|---|
| COLUMN NAME | TYPE | SIZE | DESCRIPTION |
| FILE_ID | INT | 9 | THE INTERNAL TRACKING IDENTIFIER OF THIS FILE |
| RVM_ID | INT | 6 | THE UNIQUE IDENTIFIER OF THE MACHINE WHERE THIS FILE SHOULD BE SENT |
| REQUEST_DT | DATE | | THE DATE AND TIME THIS RECORD WAS CREATED |
| SENT_DT | DATE | | THE DATE AND TIME THIS FILE WAS SENT TO THIS MACHINE |
| STATUS | INT | 4 | AN INDICATOR OF THE STATUS OF THIS TRANSACTION, IF APPROPRIATE. |

FIG. 5

| TABLE NAME: | FILE_RETRIEVAL | | |
|---|---|---|---|
| COLUMN NAME | TYPE | SIZE | DESCRIPTION |
| FILE_ID | INT | 9 | THE INTERNAL TRACKING IDENTIFIER OF THIS FILE |
| RVM_ID | INT | 6 | THE UNIQUE IDENTIFIER OF THE MACHINE FROM WHERE THIS FILE SHOULD BE COLLECTED |
| DELETE_ON_UPLOAD | CHAR | 1 | FLAG INDICATING WHETHER THIS FILE SHOULD BE DELETED AFTER IT IS COLLECTED OR NOT |
| COLLECT_ON_SICK_CALL | CHAR | 1 | FLAG INDICATING WHETHER TO COLLECT THIS FILE WHEN THE MACHINE CALLS HOME WITH AN ERROR. |
| COLLECT_ON_SCHEDULED | CHAR | 1 | FLAG INDICATING WHETHER TO COLLECT THIS FILE WHEN THE MACHINE CALLS HOME AT A SCHEDULED TIME. |

FIG. 6

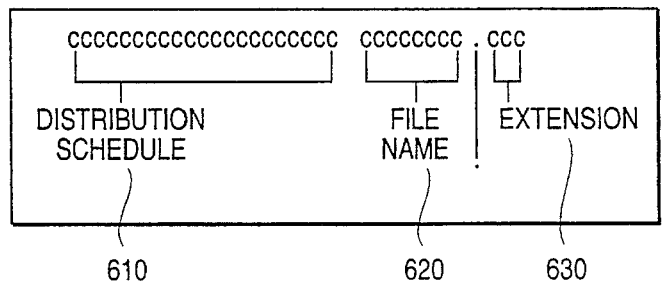

```
SCRIPT SIERRA.SPT

WIPE HORIZONTAL DOWN KIWI.SCL 10 FULL
WIPE HORIZONTAL DOWN CHILD.SCL 10 FULL
TEXT     GENERIC1.FNT 30 40 255 650 100 20 365
THE OUTDOORS
WIPE VERTICAL DOWN CRISCO.SCL 10 FULL
TEXT           GENERIC2.FNT 30 40 255 650 100 20 180
A COUCH POTATO
HOLD 1
TEXT           GENERIC2.FNT 30 30 255 -222 220 60 220
ALTERNATIVE
WIPE HORIZONTAL DOWN SCHOOL1.SCL 10 FULL
TEXT           GENERIC2.FNT 20 40 255 640 340 400 80
THE SIERRA CLUB
HOLD 5
```

HEADER → THE .SCL HEADER CONSISTS OF 10 BYTES OF DATA CORRESPONDING TO:
  BYTE 0-3: RIX PROGRAM VERSION
  BYTE 4: IMAGE WIDTH
  BYTE 5: IMAGE HEIGHT
  BYTE 6,7: COMPRESSION INDICATOR
  BYTE 8,9: RESERVED

COLOR PALETTE → THE .SCL COLOR PALETTE IS 768 BYTES LONG. THIS REPRESENTS ONE BYTE FOR EACH COLOR ELEMENT RED, GREEN, OR BLUE, FOR EACH OF THE 256 COLORS. (3 X 256=768).

PIXEL MAP INTO PALLETE → THE PIXEL MAP FOR A .SCL FORMAT PICTURE CONTAINS 640 X 400 OR 256000 BYTES. THIS IS ONE BYTE PER DOT ON THE RESULTING DISPLAYED IMAGE. EACH OF THESE BYTES CONTAINS A NUMBER FROM 0 THROUGH 255 WHICH POINTS INTO THE COLOR PALETTE FOR THIS IMAGE. WHICHEVER COLOR IS POINTED TO IN THE PALETTE IS THE COLOR OF THE CORRESPONDING DOT ON THE SCREEN.

WHEN COMBINED, THE TOTAL SIZE OF A RIX .SCL FILE IS
10 + 768 + 256000 = 256778 BYTES 1000
(920)

FIELDS
- TEXT — FT <CT> STRING
- BITMAPS/LOGOS — FB, BITMAPNAME
- LINES — FL{X/Y}, X, Y, LEN[ ,LT]
- BOXES — FLB, X, Y, W, HT [ ,LT]
- BARCODE — FC[ , INTERP] <CT> BARCODE-DATA

SELECT/SET
- POSITION — SP [R], X, Y
- JUSTIFICATION — SJ, JUSTVAL
- MAGNIFICATION — SM, XMAGVAL, YMAGVAL
- ATTRIBUTES — SA, ATTRVAL
- DIRECTION — SD, DIRVAL
- FONT — SF, FONTNAME
- MAP TABLE — ST, MAPTABLE
- BARCODE TYPE — SCT, BARCTYPE
- BARCODE RATIO — SCR, BARCSMALL, BARCWIDE [ , BARCENLARG]
- BARCODE HEIGHT — SCH, BARCHEIGHT

PRINTER COMMANDS
- PRINT LABEL — PL
- PAPER FEED — PF [ ,N]
- PAPER CUT — PC
- PAPER TEST LABEL — PT [ ,N]

DATA MANIPULATION
- DEFINE FONT HEADER — DFH, FONTNAME, DIR, FHEIGHT, BASELINE
- DEFINE FONT CHARACTER — DFC, DCHAR, WIDTH <CT> BDATA
- DEFINE FONT END — DFE
- DEFINED FONT KILL — DFK, FONTNAME
- DATA BITMAP DEFINE — DBD, NAME, XWIDTH, YHEIGHT <CT> BDATA
- DATA BITMAP ERASE — DBE, NAME
- DATA MEMORY ERASE — DME, 570828 (MAGIC-COOKIE)
- CLEAR PRINTERBUFF — DPZ

OVERALL CONTROL
- ** CURSOR AUTO INC        CAI, XINC, YINC
- ** BITMAP CHANNEL         CBC, {S/P} (CHANNEL)
- ** BITMAP TYPE            CBT, BTYPE
- ** BITMAP PROTOCOL        CBP, PROTOCOL
- ** LABEL DIMENSIONS       CD, X, Y, XOFFS
- ** SELECT PRINTER         CS, PRINTERX
- ** FEED BEFORE PRINT      CFB, FLENGTH
- ** FEED AFTER PRINT       CFA, FLENGTH
- ** CUT AFTER PRINT        CU, CUTTERACT
- ** RESET ROLL CNTR        CRZ
- ** READ ROLL CNTR         CRR
- ** CHANGE CI              CCI, CICHAR
- ** CHANGE CT              CCT, CTCHAR
- ** CHANGE LT              CCL, CLCHAR
- ** TRANSPORTER TIME       CTT, TTIME
- ** VERBOSITY LEVEL        CQL, LEVEL
- ** RESET (RESTART)        RESET
- ** OPTICAL DENSITY        CO, DENSITY
- ** ELECTRICAL             CE, HEAD

QUERY STATUS
- ** CURRENT PRINTER        QP
- ** CURRENT POSITION       QFP
- ** CURRENT DIRECTION      QFD
- ** CURRENT JUSTIFICATION  QFJ
- ** CURRENT MAGS           QFM
- ** CURRENT ATTR           QFA
- ** CURRENT BCODETYPE      QFC
- ** CURRENT FONTNAME       QFF
- ** CUTTER STATUS          QC
- ** CURRENT LABEL DIMS     QD
- ** PRINTER VERSION        QV
- ** QUERY LAST ERROR       QLE
- ** LIST FONTS             QLF
- ** LIST LOGOS             QLL
- ** LIST BARCODES          QLC

910:
```
S33
P8320
S2
*END
```

920:
```
<SV, SWD60BSN.2;
<SD, 2;
<SM, 1, 1;
<SP, 65, 150; <FT; 50¢
<SP, 15, 150; <FT; OFF
<SP, 380, 150; <FT; 50¢
<SP, 330, 150; <FT; OFF
<SP, 65, 950; <FT; 50¢
<SP, 15, 950; <FT; OFF
<SP, 380, 950; <FT; 50¢
<SP, 330, 950; <FT; OFF
<SJ, 5; <SP, 330, 500; <FT; GENERIC BEER 6 PACK
<SF, SW050 RSN.2;
<SP, 415, 500; <FT; MANUFACTURERS COUPON  EXPIRES 12/31/90
<FLB, 405, 185, 33, 630, 2;
<SF, SW030 RSN.2;
<SM, 1, 1; <SJ, 5;
<SP, 15, 500;
<FT; DISTRIBUTED BY ENVIRONMENTAL PRODUCTS CORPORATION
<SF, AT018RSN.2;
<SP, 40, 500; <FT; DON'T DRINK AND DRIVE
<SF, SW030RSN.2
<SJ, 4; <SP, 250, 450; <CAI, -18, 0;
<FT; MR. RETAILER, AS OUR AGENT,
<FT; ACCEPT THIS COUPON FOR ITS
<FT; FACE VALUE. GENERIC BEER
<FT; WILL REIMBURSE YOU FOR THE
<FT; FACE VALUE PLUS 8¢ HANDLING
<FT; SEND TO : GENERIC BEER, PO BOX
<FT; 99999, EL PASO, TEXAS 23340
<CAI, 0, 0;
<SJ, 1; <SD, 1; <SP, 130, 30; <FC; 50234500010
<SD, 3; <SP, 290, 875; <FB, LITE;
```

930: [BITMAP IMAGE]

```
1200
(930)
              | BYTE 3 | BYTE 2 | BYTE 1 | BYTE 0 |
              76543210765432107654321076543210
        ROW 0 ........XXXXXXXXXXXXXXXXXXXXXX    FF, FF, 3F, 00
            1 ........X....................X    01, 00, 20, 00
            2 ........X...............XX...X    61, 00, 20, 00
            3 ........X..............X.X...X    A1, 00, 20, 00
            4 ........X.............X...X..X    21, 01, 20, 00
            5 ........X............X....X..X    21, 02, 20, 00
            6 ........X...........X.....X..X    21, 04, 20, 00
            7 ........X..........X......X..X    21, 08, 20, 00
            8 ........X.........X.......X..X    21, 10, 20, 00
            9 ........X........X........X..X    21, 20, 20, 00
           10 ........X.......X.........X..X    21, 40, 20, 00
           11 ........X......X..........X..X    21, 80, 20, 00
           12 ........X.....X...........X..X    21, 00, 21, 00
           13 ........X....X............X..X    21, 00, 22, 00
           14 ........X...X.............X..X    21, 00, 24, 00
           15 ........XX.X..............X..X    21, 00, 28, 00
           16 ........X.XXXXXXXXXXXXXXX.X..X    FD, FF, 2F, 00
           17 ........X.................X..X    21, 00, 20, 00
           18 ........X.................X..X    21, 00, 20, 00
           19 ........X.................X..X    21, 00, 20, 00
           20 ........X.................X..X    21, 00, 20, 00
           21 ........X.................X..X    21, 00, 20, 00
           22 ........X.................X..X    21, 00, 20, 00
           23 ........X.................X..X    21, 00, 20, 00
           24 ........X.................X..X    21, 00, 20, 00
           25 ........X...............XXXX.X    F9, 03, 20, 00
           26 ........X....................X    01, 00, 20, 00
           27 ........XXXXXXXXXXXXXXXXXXXXXX    FF, FF, 3F, 00
```

Table Name: Tracking File Table

| Column Name | Type | Size | Description |
|---|---|---|---|
| Name | CHAR | 12 | Name of the Coupon or Ad |
| Time Stamp | INT | 9 | Number of seconds since 1/1/70 |
| *Serial Number | INT | 9 | Serial Number of Coupon |

* Not used for ads

METHOD AND APPARATUS FOR DISPLAY SCREENS AND COUPONS

This application is a continuation-in-part of U.S. patent application Ser. No. 07/517,207 filed on May 1, 1990, now abandoned, the content of which is relied upon and incorporated by reference.

BACKGROUND

The present invention relates to the field of display advertising, and in particular, to the display and printing of graphic information in a distributed data processing system. In a conventional distributed data processing system, a host system is connected to and controls several remote systems. The remote systems are usually slaved to the host system, but are also capable of operating independently of the host system. The remote systems accept data and instructions from the host system, process the data and instructions, and notify the host system of the results of the processing. It is not uncommon for the host system to send different data and instructions to each of the remote systems under its control.

In some distributed processing systems, the host system may send different graphics data and instructions to each of several remote systems for display. For example, first graphics data and instructions may be sent to a first remote system, second graphics data and instructions may be sent to a second remote system, and so on. In such a system, the type of graphics data to be displayed changes often. For example, if the remote systems are displaying graphics or printing coupons relating to retail advertisements, the advertisements or coupons may run at different times on different days of the week. Similarly, advertisements or coupons may be cancelled or new advertisements or coupons added or the manner in which the advertisements are displayed, such as dissolve, fadeout, etc., may change. A need exists for an extremely flexible retail graphics display system that would take into account the almost constant alteration of the displayed information, while still keeping system overhead to a minimum.

SUMMARY OF THE INVENTION

It is an object of the present invention to allow flexibility in the display of retail advertisement graphics and the printing of retail coupons.

It is a further object of the present invention to keep system overhead of a distributed processing system to a minimum.

It is a still further object of the present invention to allow a host system to alter all information concerning a retail graphic advertisement stored in a remote system.

It is a still further object of the present invention to allow a host system to alter all information concerning a retail coupon stored in a remote system.

It is a still further object of the present invention to compact data sent to the remote system to a greatest degree possible.

Additional advantages of the present invention will be set forth in part in the description which follows and in part will be obvious from that description or may be learned by practice of the invention. The advantages of this invention may be realized and obtained by the methods and apparatus particularly pointed out in the appended claims.

The present invention obtains the objects listed above by allowing the host system to alter all information concerning retail graphics advertisements and coupons by downloading information to the remote system and by sending files that refer to the downloaded information.

To achieve the objects and in accordance with the purpose of the invention, as embodied and broadly described herein, the invention involves downloading all information required to display graphics or print coupons and organizing the information in sets of display data, sets of commands, and sets of transaction data.

In another aspect, the present invention is a method of displaying a screen display in a system including an interconnected host processor and remote processor, the method comprising the steps of: storing in a memory of the remote processor a plurality of sets of data, including a plurality of sets of display data, a plurality of sets of commands, and a plurality of sets of transaction data, each set of display data describing a display screen, each set of commands specifying a set of display data, and each set of transaction data corresponding to a transaction to be performed and specifying a scheduled time to display a display screen and further specifying a set of commands; sending, by the host processor to the remote processor, a set of data that is a set of display data, a set of commands or a set of transaction data; receiving, by the remote processor, the set of data; storing, by the remote processor, the received set of data as part of the plurality of sets of display data, part of the plurality of sets of commands, or part of the plurality of sets of transaction data; determining whether the set of data is a set of transaction data; retrieving from the memory of the remote processor a set of commands specified by the received set of transaction data from the plurality of sets of commands, when the set of data is a set of transaction data; retrieving from the memory of the remote processor a set of display data specified by the retrieved set of commands from the plurality of sets of display data, when the set of data is a set of transaction data; and displaying, by the remote processor, a display screen described by the retrieved set of display data, at the predetermined time, according to the retrieved set of commands, when the set of data is a set of transaction data.

In still another aspect, the present invention is a method of printing a coupon in a system including an interconnected host processor and remote processor, the method comprising the steps of: storing in a memory of the remote processor a plurality of sets of data, including a plurality of sets of commands and a plurality of sets of transaction data, each set of transaction data corresponding to a transaction to be performed and specifying a scheduled time period during which a coupon may be printed and further specifying a set of commands, and each set of commands describing the coupon to be printed and including instructions for printing the coupon; sending, by the host processor to the remote processor, a set of data that is a set of commands or a set of transaction data; receiving, by the remote processor, the set of data; storing, by the remote processor, the received set of data as part of the plurality of sets of commands or the plurality of sets of transaction data; determining whether the set of data is a set of transaction data; retrieving from the memory of the remote processor a set of commands specified by the received set of transaction data from the plurality of sets of commands, when the received set of data is a set of transaction data; and printing, by the remote processor, a coupon described by the retrieved set of commands, during the scheduled time period when the received set of data is a set of transaction data.

BRIEF DESCRIPTION OF THE DRAWINGS

The accompanying drawings, which are incorporated in and which constitute a part of this specification, illustrate one embodiment of the invention and, together with the description, explain the principles of the invention.

FIG. 2 shows a format of a table for recording the names and locations of files in the memories of the remote processors of FIG. 1;

FIG. 3 shows a format of a table for recording the names and locations of files in the memory of the host processor of FIG. 1;

FIG. 4 shows a format of a table for recording in the memory of the host processor of FIG. 1, the distribution of files for ads and coupons in the remote processors of FIG. 1;

FIG. 5 shows a format of a table for recording in the memory of the host processor of FIG. 1, the retrieval status of files for ads and coupons in the remote processors of FIG. 1;

FIG. 6 shows a format of one line of a transaction file for ads or coupons in the memory of a remote system of FIG. 1;

FIG. 7 shows a format of a command file for ads in the memory of a remote system of FIG. 1 by way of an example;

FIG. 8 shows a format of a display file for ads in the memory of a remote system of FIG. 1;

FIGS. 10A and 10B further show the format of commands in a command file for coupons in the memory of a remote system of FIG. 1;

FIG. 11 shows an example of a command file for coupons having the format of FIGS. 9 and 10;

FIG. 12 shows a continuation of the example of FIG. 11;

FIG. 15 shows a format of a coupon_tracking or ad_tracking table in the memory of the host system of FIG. 1.

DESCRIPTION OF THE PREFERRED EMBODIMENTS

Reference will now be made in detail to a presently preferred embodiment of the invention, examples of which are illustrated in the accompanying drawings.

The present invention is preferably embodied in a retail display system called a "reverse vending machine." The reverse vending machine resembles a conventional vending machine, with the addition of a display screen, an input slot and a coupon printer. When a user places an empty beverage container, such as a plastic milk jug or a soft drink can or bottle, in the input slot, the user chooses one of a plurality of methods of remuneration, such as cash, a cash voucher, a monetary gift to be donated to charity, etc. Such machines are usually placed in retail outlets such as grocery stores to allow customers to dispose of their empty beverage containers.

While beverage containers are being inserted into the reverse vending machine, the reverse vending machine preferably displays a variety of advertisements and public service announcements (both hereinafter called ads) on a built-in display. These ads can be either static, i.e., non-moving, or animated, i.e., containing moving components. The present invention is directed to the display of these ads in a distributed display system. By way of example, one embodiment of the invention is directed to the display of these ads in a reverse vending machine system. The present invention could, however, be embodied in any type of distributed display system. For example, the present invention could be embodied in a system whose sole function is to display ads in a retail store.

Some embodiments of the present invention also include a mechanism for printing and dispensing retail coupons. For example, a coupon for a discount on a retail product may be printed and dispensed whenever beverage containers are inserted into the reverse vending machine. The present invention is directed to the printing of these coupons. By way of example, one embodiment of the invention is directed to the printing of coupons in a reverse vending machine system. The present invention could, however, be embodied in any type of distributed display system.

Other embodiments of the present invention also include a compact disk player, which plays ads from compact disks on the screen. Ads stored on compact disks may be static ads or "full video" ads and will be discussed further below.

Figure 1:
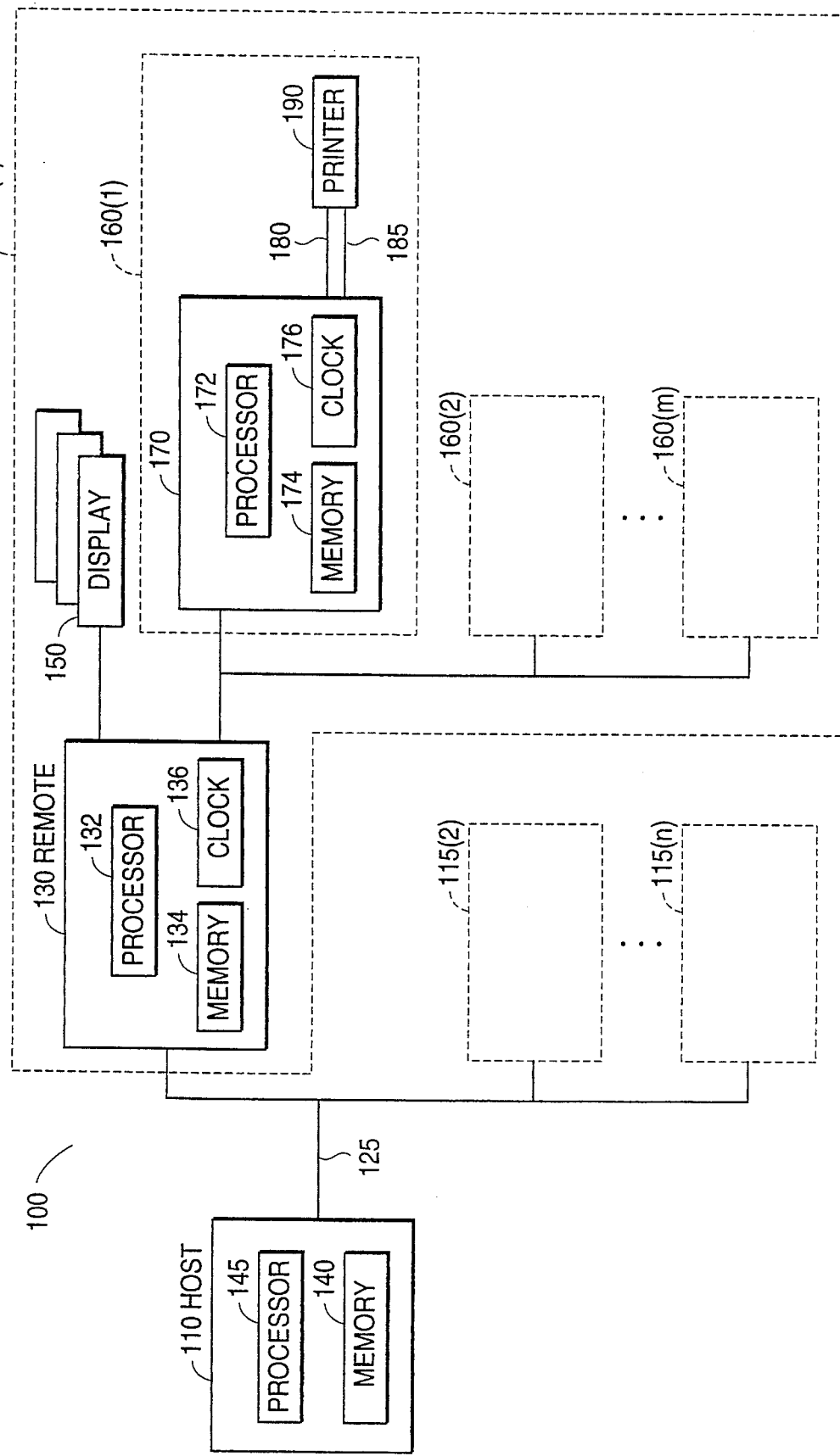
FIG. 1 is a block diagram of a distributed processing system including a host system having a memory and several remote systems, each having a display controller with a plurality of display screens and a plurality of reverse vending machines.

FIG. 1 is a block diagram of a distributed processing system 100 including a host system 110 and a plurality of remote systems 115(1)...115(n). Host system 110 includes a memory 140 and a processor 145. Each remote system 115(1)...115(n) includes a display controller 130, at least one display 150, and at least one reverse vending machine system 160. Each display controller 130 includes a processor 132, a memory 134 and a clock 136, and is connected to at least one display 150. Each reverse vending machine system 160 includes a reverse vending machine 170 and a printer 190, connected to the reverse vending machine by a serial communications line 180 and a parallel communications line 185. Each reverse vending machine 170 includes a processor 172, a memory 174, and a clock 176.

Host system 110 and remote systems 115(1)...115(n) are interconnected by a transmission line 125. In a preferred embodiment, the host system 110 and each of remote systems 115(1)...115(n) are equipped with a modem, and transmission line 125 is a standard telephone line. Transmission line 125 could also be a dedicated transmission line physically connecting host system 110 and remote systems 115(1)...115(n) or any apparatus that allows signals to pass between the systems.

As stated above, host system 110 includes a memory 140. Memory 140 is preferably a hard disk, but may also include RAM, floppy disk drives, tape, or the like. Memory 140 includes a plurality of files, some of which are described below, which include information relating to the display of various ads on remote systems 115(1)...115(n) and information relating to printing of various coupons on remote systems 115(1)...115(n). Portions of these files are described below.

Memory 140 includes a variety of tables for tracking and manipulating files between the host processor 110 and remote systems 115(1)...115(n), including a "site file table," "host file table," "file distribution table," and "file retrieval table" as shown in FIGS. 2–5 and described below.

Information is transmitted along transmission line 125 from host system 110 to remote systems 115(l)...115(n) regarding which ads to display and which coupons to print. In the present embodiment, this information is transmitted at a scheduled time, at the occurrence of an error in a remote system, or when the host system instructs the remote system to transmit. However, in other embodiments transmission may be initiated based upon whatever other criteria are desirable.

As stated above, each remote system 115(l)...115(n) includes a memory 134 and a memory 174, which are preferably hard disks, but may also include RAMs, optical disks, or the like. The files used by each remote system 115(l)...115(n) are stored in memory 134 and memory 174.

To achieve the greatest flexibility in the system of the present invention, a certain amount of information is directly placed in each of memories 134 and 174 upon installation of the remote processor and all other information stored in memories 134 and 174 is downloaded to remote systems 115(l)...115(n) from memory 140 of host system 110. The downloaded information for ads and coupons are sent to the remote systems 115(l)...115(n) according to the information in the file distribution tables, without distinction as to what type of files they are.

The transmitted files are functionally organized into "display files," "command files" and "transaction files." These files have a predetermined format, as described below.

Each remote system 115 receives data describing different ads and coupons. Once the display files, the command files and the transaction files have been downloaded to remote system 115, remote system 115 displays retail graphic ads and prints coupons according to the downloaded files. For display ads, a transaction file indicates a command file to execute a display and a time to execute the display. The command file indicates at least one display file, which contains graphics information describing a video ad. For coupons, a transaction file indicates a command file to print a coupon and a time period during which the coupon may be printed. The command file describes a coupon appearance and contains commands for printing the coupon.

These files can be downloaded periodically. Preferably, display files are downloaded to the remote systems weekly. Thus, information describing new static, animated, and full video displays, as well as coupons are introduced into the remote systems every week. Preferably, command files are downloaded weekly. Thus, new ads and coupons are introduced into the remote systems every week. Preferably, transaction files are downloaded weekly. Thus, instructions to display certain ads or to print new coupons at certain times are introduced into the remote systems every week.

Next, information stored in memory 140 of host system 110 and used to generate the display files is discussed. Memory 140 of host system 110 contains data describing all ads and coupons that can be displayed by the remote system.

Ad display files are bitmaps describing ads. Ad command files are described in connection with FIG. 7 below. Ad transaction files contain information describing when the ads are to be displayed.

Coupon command files are described in connection with FIGS. 9-12 below, and contain information describing each coupon. Coupon transaction files contain information indicating during which time periods each coupon is to be printed.

FIG. 2 shows a format for a site file table which records the names and exact locations of all files in the memories of remote systems 115(l)...115(n).

FIG. 3 shows a format for a host file table which records the names and exact locations of all files in the memory 140 of the host processor 110.

The file distribution table and the file retrieval table in the host memory 140 regulate what files are sent to the remote systems and what files are retrieved from the remote systems. The host processor transmits files to the remote systems based on the information in the file distribution table, and retrieves files from the remote systems according to the file retrieval table.

FIG. 4 shows a format for the file distribution table in the memory 140 of the host system of FIG. 1. The file distribution table contains the names of files which should be sent to remote systems, information indicating to which remote system each file should be sent, a date and time at which the record was created (i.e., when the request to transmit was made), and the status of the transaction, if any. The distribution table is used by the host to determine to which remote systems it must download display files, command files, and transaction files for ads or coupons. The host system will proceed to transmit the appropriate files to their destination remote system the next time after the request is made that the remote system desired as a destination contacts the host. When the transmission of files is completed, the date and time of transmission is then recorded in the transmission file table.

FIG. 5 shows a format for the file retrieval table. The file retrieval table contains the names of the files which should be retrieved and information regarding from which remote systems they should be retrieved. When the remote system contacts the host system, the host system will proceed to retrieve the appropriate files from the remote systems the files are in, depending upon the flags COLLECT_ON_SICK_CALL and COLLECT_ON_SCHEDULED. The COLLECT_ON_SICK_CALL flag indicates whether or not the file is retrieved when the remote system calls home with an error. The COLLECT_ON_SCHEDULED flag indicates whether or not the file is retrieved when the remote system calls home at a scheduled time.

In addition, the file retrieval table in FIG. 5 includes a column for a DELETE_ON_UPLOAD flag which indicates whether or not a retrieved file should be deleted in the remote system after it is retrieved by the host processor.

The above description concerns files stored in memory 140 of host system 110. The following discussion concerns files downloaded from host system 110 to one or more of remote systems 115(l)...115(n). Because display files, command files, and transaction files have substantially identical formats on the host system and the remote systems, display files, command files, and transaction files are described below in connection with the remote system. It is understood that command files, display files, and transaction files are stored on the host system, as well.

Each transaction file is defined for a specific remote system 115, and thus, for example, an ad or coupon may run for one hour on one day in a week at a first remote system 115 and run every hour of every day in a week at a second remote system 115. Thus, each transaction file is created by processor 145 of host system 110 for each remote system 115 according to the information regarding when and where a given ad or coupon should be displayed or printed.

Figure 14:
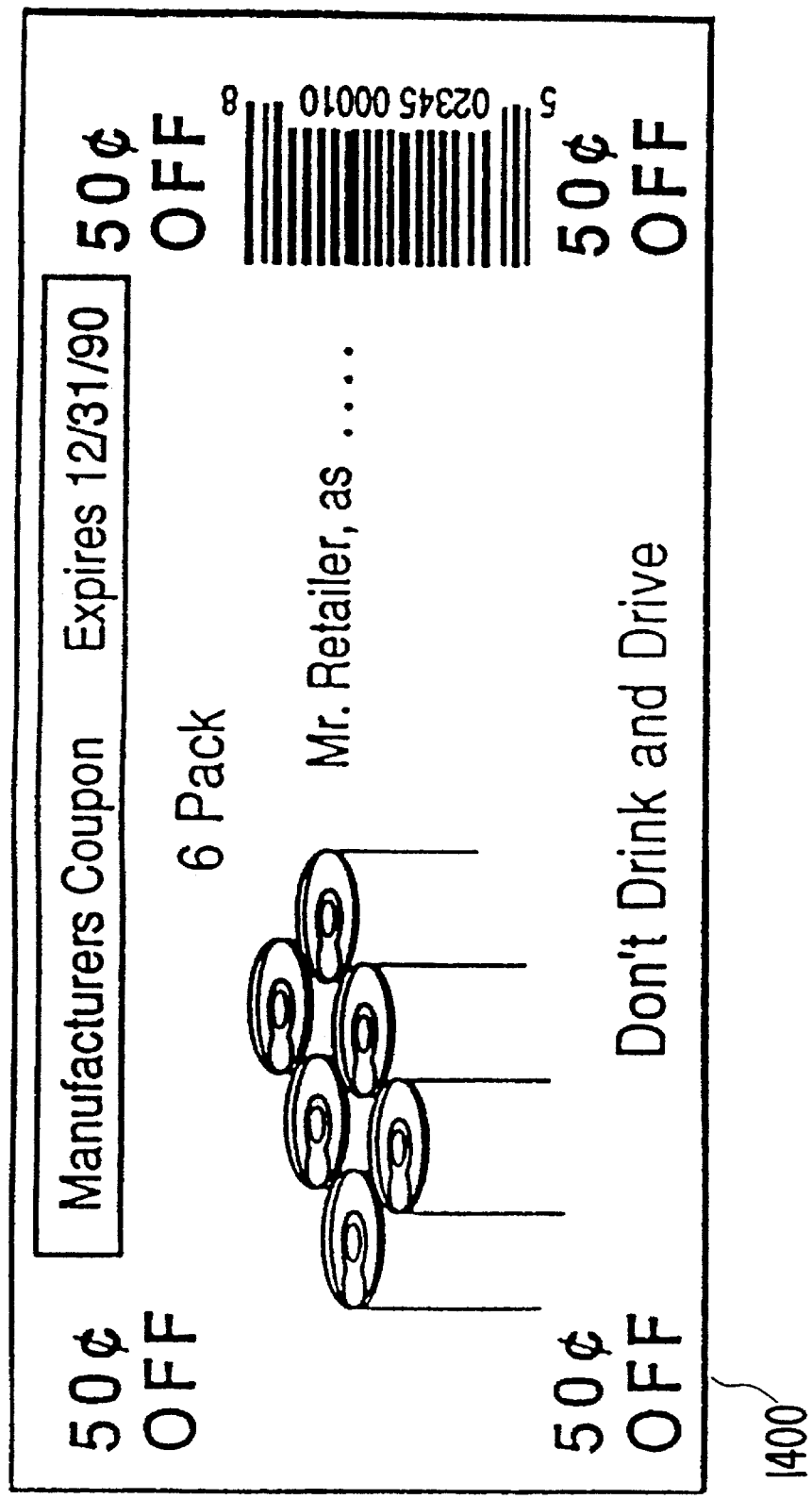
FIG. 14 shows an example of a coupon displayed by the present invention.

FIG. 14 shows an example of a coupon 1400 printed by a preferred embodiment of the invention. Coupon 1400 is discussed further in relation to FIG. 12.

FIG. 6 shows the format of one line for a transaction file that may be used for either an ad or a coupon. This line in the transaction file is comprised of a distribution schedule 610 as well as a filename 620 and extension 630 separated by a period. The transaction file may be a single line, or it may be multiple lines as desired. Each line has the same format sown in FIG. 6.

The distribution schedule 610 is a 21 byte character field which contains one bit for every hour in a week. Each bit in the string represents one hour in the week. A bit value of one allows for the presentation of the ad during that hour. The bitwise string is converted into an ASCII representation of hexadecimal digits. The first bit represents Sunday 12 Midnight to 1 A.M. The second bit represents Sunday 1 A.M. to 2 A.M., etc. If the display is to be created, or a coupon printed, during a specified time in the week then the corresponding bit will be set to 1, otherwise it will be set to 0.

The filename 620 and extension 630 separated by a period combine to form up to a 12 byte character string representing the DOS file name of the control file to be executed to create the appropriate display or coupon.

For example, the transaction file line "FFFFFFFFFFFFFFFFFFFFF sample.cpn" instructs the remote processor to distribute the coupon printed by the command file "sample.cpn" during each hour of each day of the week. In contrast, the transaction file line "000FFFFFFFFFFFFFFFF000 sample2.cpn" instructs the remote processor to distribute the coupon printed by the command file "sample2.cpn" each hour of each day of the week except Sunday and Saturday.

FIG. 7 shows a format of a command file 700 for ads in the memory 134 of a display system 130 of a remote system 115 and memory 140 of FIG. 1 by way of example. The command file 700 contains a series of commands relating to the display of one or more display files to define an ad and has the same format on both host system 110 and remote systems 115. In FIG. 7, a keyword "SCRIPT" is followed by the name of the command file (for example, "sierra.spt").

Each of the following lines in FIG. 7 represents a command for displaying the ad "sierra.spt." The first line ("WIPE HORIZONTAL DOWN kiwi.sc1 10 full") instructs processor 132 of a remote system to display a static graphics display in the display file "kiwi.sc1" for ten seconds before erasing the display with a horizontal downward wipe, a term that is well-known to persons of ordinary skill in the art. The second line instructs processor 132 to perform the same operation for a display file "child.sc1."

The third line ("TEXT generic.fnt 30 40 255 650 100 20 365") and the fourth line ("THE OUTDOORS") instructs processor 132 to move the ASCII text "THE OUTDOORS" across the screen using a typeface stored in a file "generic.fnt." The numerals "30, 40, 255, 650, 100 20 365" on the third line are predetermined codes, respectively, for text color, text size, relative speed of display, beginning X coordinate, beginning Y coordinate, ending X coordinate, and ending Y coordinate. In the example, the font is stored in a bit-mapped format.

The fifth line is similar to the first and second lines. The sixth and seventh lines are similar to the to the third and fourth lines.

The eighth line ("HOLD 1") instructs processor 132 to hold the static graphics currently on the screen for one second. The ninth and tenth lines are similar to the third and fourth lines, and the eleventh through twelfth lines have formats similar to lines already described.

FIG. 8 shows a format of a display file 800 for ads in the memory 134 of the display processor of a remote system of FIG. 1. In a preferred embodiment, display files are created and edited with a commercial software product, namely WINRIX, which is manufactured by RIX Software, Inc. This format provides a 640×400 pixel resolution with 256 colors. In a preferred embodiment, the files thus created are further modified by proprietary software developed by applicant, which adjusts certain color palette definitions and trims picture borders automatically. The modification of these files forms no part of the invention, and so possession of this proprietary software is not necessary for practice of the invention. Non-modified display files or files modified by another means will yield equivalent results. Therefore, any suitable method of storing graphical representations of ads may be used to practice the invention.

Figure 9:
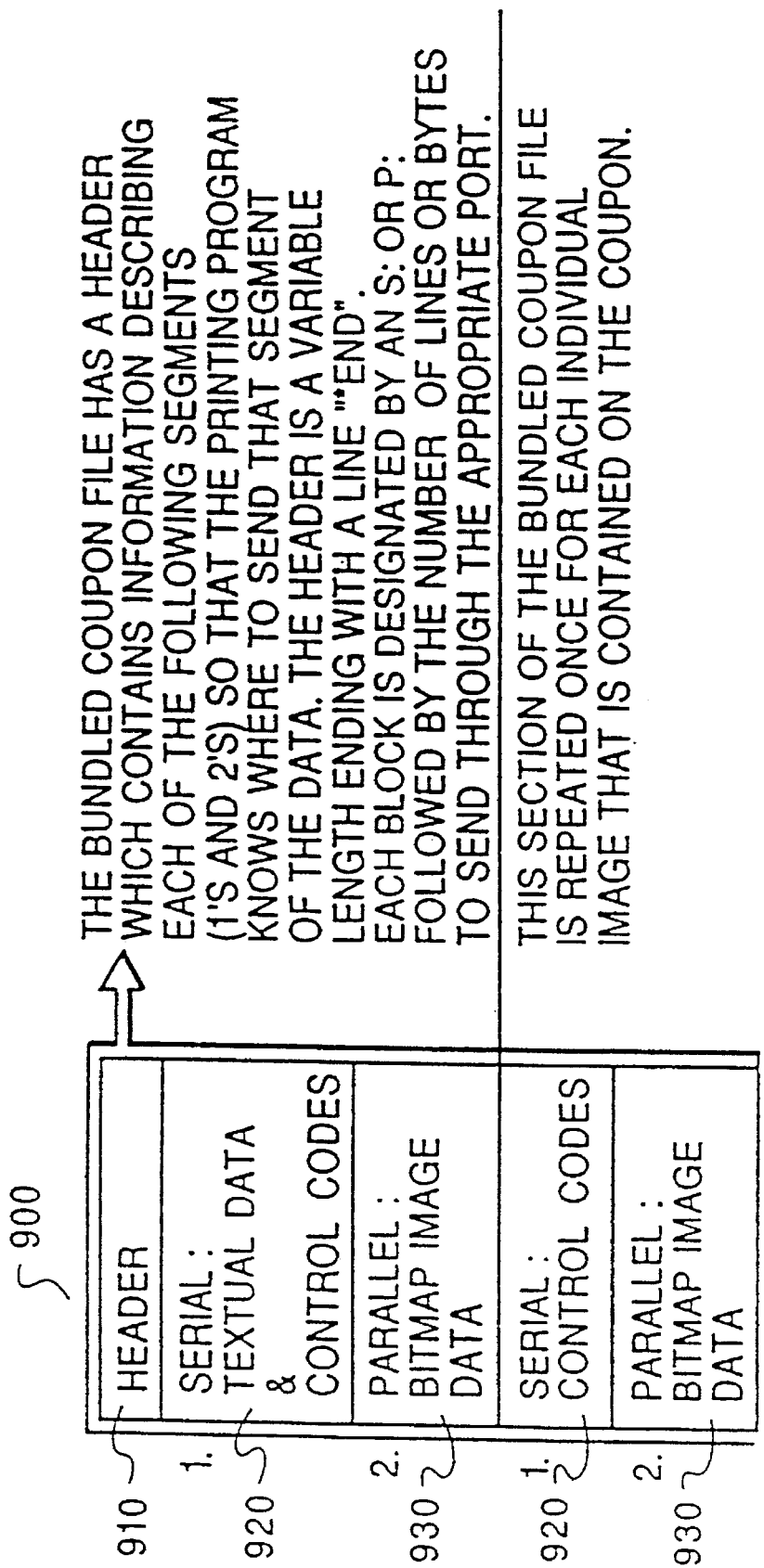
FIG. 9 shows a format of a command file for coupons in the memory of a remote system of FIG. 1.

FIG. 9 shows a format of a command file for coupons 900 in the memory 174 of the reverse vending machine of a remote system of FIG. 1. FIGS. 10A–10B further show the format of the command file for coupons. FIG. 11 shows an example of a command file for a coupon. FIG. 12 shows an example of a coupon bitmap included in the example of FIG. 11. The coupon command file contains a series of commands relating to the printing of a coupon and has the same format on both host system 110 and remote systems 115.

An overall format of command files for a coupon is shown in FIG. 9. In a preferred implementation of the invention, printer 190 can receive data over a serial communications line 180 and a faster parallel line 185. To attain a fastest data transmission time, bitmaps describing the non-text images on a coupon are sent over the parallel line 185 and commands that need to be interpreted by printer 190 are sent over the serial line 180. This is done in order to relieve the parallel line communications task on the printer from having to interpret every byte sent from reverse vending machine 170. Instead, printer 190 can simply pass any data received directly to an internal image data buffer (not shown). This method greatly increases the total data download speed between reverse vending machine 170 and printer 190.

As shown in FIGS. 9 and 11, the command file for a coupon 900 includes a header 910 indicating numbers of bytes to send respectively on the serial and parallel lines of printer 190. Printer 190 first receives on the serial port a number of lines of commands to be sent on the serial port ("33" in FIG. 1). Because no data is interpreted when received on the parallel port, printer 190 first receives on the serial line 180 a number of bytes to expect on the parallel line 185 ("8320" in FIG. 11). After printer 190 has received this number of bytes, printer 190 reverts to receiving and interpreting data on the serial line and receives a number of lines indicated in FIG. 11 by a "S" followed by "2". The number of groups of parallel and serial bytes are indicated by the number of "P" and "S" lines in the header of FIG. 9. The header of FIG. 9 is ended by the ASCII characters "*END".

FIGS. 10A–10B further show the format of data 920 sent over the serial line 180 of printer 190. Each separate image to be sent to a coupon has a format as follows:

<CI>cmd[,parameters...]<CT>[data<LT>]

where "<CI>" is a "command introducer," which preferably defaults to an ASCII escape character; "cmd" is a command consisting of one or more characters AND followed by zero or more comma-separated parameters, which are followed by a "command terminator" "<CT>," which preferably defaults to a semicolon; "<CT>" is optionally followed by data; and the data is terminated by a "line terminator" "<LT>," which preferably defaults to an ASCII line feed character.

FIGS. 10A–10B show six types of commands used to print coupons: field commands, select/set commands, printer commands, overall control commands, data manipulation commands, and query status commands. It should be understood that these commands are shown by way of example only, and that the actual commands in a command file will differ depending on such factors as a type of printer used, etc.

In FIGS. 10A–10B the field commands include commands to print text ("FT"), bitmaps and/or logos ("FB"), lines ("FL"), boxes ("FLB"), and barcodes ("FC").

The select/set commands include commands to select a position on the output medium ("SP"), to select a column for right or left justification ("SJ"), to select a magnification in the X and Y directions for all printed data ("SM"), to select a printer attribute ("SA"), to select a print direction ("SD"), to select a printer font ("SF"), to select a maptable ("SM"), to select a barcode type ("SCT"), to select a barcode ratio ("SCR"), and to select a barcode height ("SCH").

The printer commands include commands to print a predetermined label ("PL"), to send a paper feed code ("PF"), to cut the paper, when the printer attached to reverse vending machine 170 has this capability ("PC"), and to print a predetermined test label ("PT").

The data manipulation commands include commands define a font header ("DFH"), to define a font character ("DFC"), to define a font end ("DFE"), to kill a defined font ("DFK"), to define a data bitmap ("DBD"), to erase a data bitmap ("DBE"), to erase memory contents ("DME") which includes a safety code to avoid accidental erasure, and to clear a print buffer ("DPZ").

The overall control commands include commands to automatically increment the cursor position ("CAI"), to set a bitmap channel ("CBC"), to set a bitmap type ("CBT"), to set a bitmap protocol ("CBP"), to label dimensions ("CD"), to select a printer ("CS"), to feed before print ("CFB"), to feed after print ("CFA"), to cut after print ("CU"), to reset a printer roll center ("CRZ"), to read a roll center ("CRR"), to change the default <CI> character ("CCI"), to change the default <CT> character ("CCT"), to change the default <LT> character ("CLT"), to set a printer transporter time ("CTT"), to set a printer verbosity level ("CQL"), to reset the printer ("RESET"), to set an optical density value ("CO"), and to set an electrical density value ("CE").

The query status commands include commands for querying the status of the current printer ("QP"), the current printer position ("QFP"), the current printer direction ("QFD"), the current printer justification ("QFJ"), the current font magnification ("QFM"), the current printer attributes ("QFA"), the current barcode type ("QFC"), the current font name ("QFF"), the current printer cutter status ("QC"), the current label dimensions ("QD"), the current printer version ("QV"), the last error reported ("QLE"), the current list of fonts ("QLF"), the current list of logos ("QLL"), the current list of barcodes ("QLC"), and the current memory status ("QMP," "QMR," "QMF," "QMS," "QMN," or "QMI").

The above described command files for both ads and coupons are intended to be exemplary only. Other commands may be included or commands may be deleted without affecting the scope of the present invention.

FIG. 11 shows an example of a coupon command file 1100 having the format of FIGS. 9 and 10A–10B. The coupon command file of FIG. 11 prints the coupon shown in FIG. 14. Not all the commands of FIGS. 10A–10B are included in the example, which is presented for purposes of example only.

In FIG. 11 a first line sets a font name of "SW060BSN.2." A second line sets a printer direction of "2," indicating a negative Y direction. (Preferably, "1" is a positive X direction, "3" is a negative X direction, and "4" is a positive Y direction). A third line sets a magnification of a font. A fourth line sets a Y position of "65" and an X position of "150" and prints a text string of "50¢." Fifth through eleventh lines perform similar steps to that of the fourth line. A twelfth line sets a justification value and prints the text "Generic Beer 6 Pack."

A thirteenth line sets a font name of "SW050RSN.2." A fourteenth line prints the text "Manufacturers Coupon" at a predetermined position and a fourteenth line prints a box around the text. Fifteenth through thirtieth lines perform similar steps. A thirty-first line sets a default increment value of zero for the remainder of the coupon image, so that subsequent text can be positioned absolutely. A bit map image 930, such as that shown in FIG. 12, follows the thirty-first line and is sent on the parallel line. Once the last line of coupon command file 1100 is sent, the reverse vending machine sends the command "PL" over the serial line and prints the coupon defined by the lines of the coupon command file 1100. The "PL" command instructs printer 190 to print all the accumulated text and bitmap data currently in its buffers onto a coupon, along with a form feed character and a paper cut character.

FIG. 12 shows a first preferred format of a bitmap image included in a coupon command file, such as that shown in FIG. 11. The format of FIG. 12 is shown for purposes of example, and not as a limitation. In FIG. 12, a bit-mapped picture is encoded in 16 bit words, low byte first. The picture of FIG. 12 is included herein solely for purposes of example. In FIG. 12, "." represents a white dot and "X" represents a black dot. A hexadecimal representation of this pattern appears at the right of FIG. 12. Thus, in the first row of FIG. 12, the hexadecimal values "ff,ff,3f,00" represent the first row of dots where a rightmost word of dots (ff,ff) is represented in low byte, high byte order, and a next word of dots (00,3f) is represented in low byte, high byte order.

Figure 13:
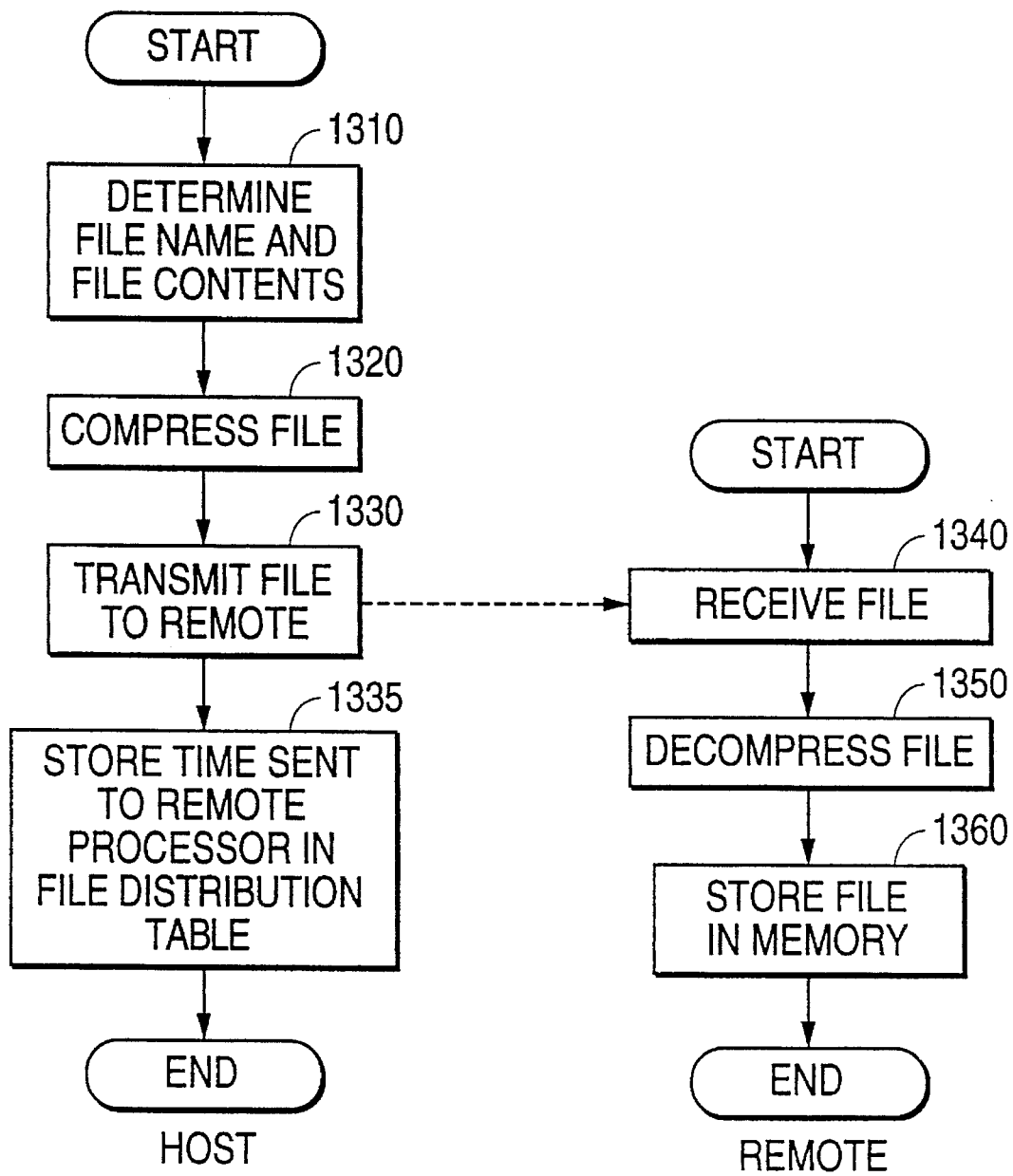
FIG. 13 is a flow chart of a method for downloading a display file of FIG. 8, a command file of FIGS. 7 or 9–12, or a transaction file of FIG. 6.

FIG. 13 is a flow chart 1300 of a method for downloading a display file of FIG. 12, a command file of FIGS. 7 or 9–12, or a transaction file of FIG. 6. Flow chart 1300 includes steps 1310–1360. Steps 1310–1330 are performed by processor 145 of host system 110 and steps 1340–1360 are performed by processor 132 or 172 of a remote system 115. In step 1310 processor 145 determines the name of the file to download. This determination step is the same for each of display files, command files and transaction files. Display files contain graphics information required to display one graphics picture on display 150 or to print one coupon on printer 190. The display files are created by a number of methods, including scanning an existing picture, using a commercial software paint program, converting video input, etc. The display files have a format known to persons of ordinary skill in the art and are named according to a convention of the commercial software package WINRIX.

Command files have a format shown in FIGS. 7 and 9–12 and are created by a user, either by typing ASCII text into a file or by an interactive process (not shown). Command files have the filename extension ".SPT", which stands for "SPOT."

In step 1320 of FIG. 13 processor 145 compresses the file to be downloaded into a compact form to speed transmission. In a preferred embodiment of the invention, the file is compressed by use of a commercial software product, namely PKZIP, manufactured by PKWARE, Inc. of Glendale, Wis. This software determines which of a number of well-known compression algorithms will most compress the file. This algorithm is then applied to the file and an indication of the algorithm used is included with the compressed file. In general, step 1320 is an optional step and any appropriate algorithm may be used to decrease the number of bytes of the file.

In step 1330 processor 145 transmits the compressed file to one or more of remote systems 115 over transmission line 125 using a well-known transmission method. A preferred embodiment of the present invention uses a 19200 BAUD MNP4 modem. In step 1335 processor 145 stores the time sent to the remote processor in the file distribution table shown in FIG. 4.

Similarly, in step 1340, processor 132 OR 172 receives the compressed file and, in step 1350, decompresses the file according to the information transmitted with the file concerning the type of compression algorithm used in step 1320. In step 1360, processor 132 or 172 stores the decompressed file in memory 134 or 174 respectively.

As discussed above, once the display files, the command files and the transaction files have been downloaded to remote system 115, remote system 115 determines which ads and coupons to present according to the downloaded files. A transaction file indicates a command file to display and a time to display it. The command file indicates at least one display file, which contains graphics information.

In a preferred embodiment of the present invention, the displayed graphics ad includes limited animation. This is accomplished by rapidly displaying a series of display files that differ from each other only slightly.

In a preferred embodiment, each remote system 115 periodically sends over transmission line 125 to the host system 110, statistics gathered concerning ads displayed or coupons printed by a remote processor. FIG. 15 show a format of a data file table 1500 in memory 140 for storing statistics returned from remote systems 115.

For each ad that is displayed or coupon that is printed the remote processor will create an entry into a data file table 1500. This table will contain the command file name of the ad or coupon as well as a time stamp indicating the time that the ad was displayed or the coupon was printed. This time stamp will be in the form of an integer representing the number of seconds from 12:00:00 A.M. on Jan. 1, 1970, until the time of printing or displaying. In the case of coupons the data file table will also contain the individual serial number of the coupon that was printed. Each additional time an ad is displayed or a coupon is printed, a new entry is appended to the data file table indicating the time stamp and serial number, if any.

The host processor retrieves these files from the remote processor when the remote processor calls home at a scheduled time. When the files are retrieved by the host processor, their filenames and new locations in the host memory are added to the host file table shown in FIG. 3.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A method of displaying a screen display in a system including an interconnected host processor and remote processor, the method comprising the steps of:

storing in a memory of the remote processor a plurality of sets of data, including a plurality of sets of display data, a plurality of sets of commands, and a plurality of sets of transaction data, each set of display data describing a display screen, each set of commands specifying a set of display data and including a series of commands for controlling display of a display screen, and each set of transaction data corresponding to a transaction to be performed and specifying a set of commands and a scheduled time period to display a display screen, the scheduled time period indicating one or more times of day when a display screen will be displayed;

sending, by the host processor to the remote processor, a set of data that is one of a set of display data, a set of commands, and a set of transaction data;

receiving, by the remote processor, the set of data;

adding, by the remote processor, the received set of data to the plurality of sets of display data, the plurality of sets of commands, or the plurality of sets of transaction data already stored in the memory;

determining whether the received set of data is a set of transaction data;

retrieving from the memory of the remote processor a set of commands from the plurality of sets of commands as specified by the received set of transaction data, when the received set of data is a set of transaction data;

retrieving from the memory of the remote processor a set of display data from the plurality of sets of display data as specified by the retrieved set of commands, when the received set of data is a set of transaction data; and displaying, by the remote processor when the set of data is a set of transaction data, a display screen described by the retrieved set of display data, only at the one or more times of day indicated by the scheduled time period as specified in the received set of transaction data.

2. The method recited in claim 1, further comprising the steps of:

prior to the sending step, storing in the host processor locations in the remote processor of the plurality of sets of data; and prior to the determining step, storing in the memory of the host processor a location in the remote processor of the sent set of data.

3. The method of claim 1, further including the steps of:

compacting the set of data, by the host processor, before the sending step, using one of a plurality of compaction methods most suited to the set of data; and decompacting the set of data, by the remote processor, after the receiving step.

4. The method of claim 1, wherein the set of data is a set of display data, the plurality of sets of display data have a predetermined format, and the method further includes the steps, performed before the sending step of:

inputting an image by the host processor to the remote processor; and converting the input image to a set of display data having the predetermined format.

5. The method of claim 1, wherein the set of commands includes display screen erase, text display and display screen hold commands and the displaying step further includes the steps of:

erasing the display screen described by the set of display data after a predetermined period of time when a next command in the set of commands is a display screen erase command;

displaying a text message superimposed on the display screen described by the display data when a next command in the set of commands is a text display command; and displaying the display screen described by the set of display data for a predetermined period of time when a next command in the set of commands is a display screen hold command.

6. The method of claim 1, wherein the step of storing a plurality of sets of display data includes the step of storing in a memory of the remote processor a plurality of sets of display data, each set of display data describing a plurality of display screens;

wherein the step of retrieving a set of display data specified by the retrieved set of commands includes the step of retrieving a first portion of display data, describing a first display screen, from a plurality of portions in the retrieved set of display data;

wherein the step of displaying the retrieved set of display data according to the retrieved set of commands includes the step of displaying the first portion of display data for a predetermined period of time; and wherein the retrieving and displaying steps are repeated iteratively for each of the plurality of portions of retrieved display data, resulting in an animated display.

7. A method of displaying a screen display in a system including an interconnected host processor and remote processor, the method comprising the steps of:

storing in a memory of the remote processor a plurality of sets of data, including a plurality of sets of display data and a plurality of sets of commands, each set of display data describing a display screen and each set of commands specifying a set of display data and including a series of commands for controlling display of a display screen;

receiving, by the remote processor from the host processor, a set of transaction data corresponding to a transaction to be performed, said set of transaction data specifying one of the plurality of sets of commands and a scheduled time period to display a display screen, the scheduled time period indicating one or more times of day when a display screen will be displayed;

retrieving from the memory of the remote processor the set of commands specified by the received set of transaction data;

retrieving from the memory of the remote processor a set of display data specified by the retrieved set of commands; and displaying, by the remote processor, a display screen described by the retrieved set of display data, only at the one or more times of day indicated by the scheduled time period as specified in the received set of transaction data.

8. A method of displaying a screen display in a system including an interconnected host processor and remote processor, the method comprising the steps of:

sending, by the host processor, a set of display data, a set of commands, and a set of transaction data to the remote processor, the set of display data describing a display screen, the set of commands specifying a set of display data and including a series of commands for controlling display of a display screen, and the set of transaction data specifying a set of commands and a scheduled time period to display a display screen, the scheduled time period indicating one or more times of day when a display screen will be displayed;

receiving, by the remote processor, the set of display data, the set of commands, and the set of transaction data;

storing the received set of display data in a memory of the remote processor;

storing the received set of commands in the memory of the remote processor;

storing the received set of transaction data in the memory of the remote processor;

retrieving from the memory of the remote processor the set of commands specified by the set of transaction data sent by the host processor;

retrieving from the memory of the remote processor the set of display data specified by the retrieved set of commands; and displaying, by the remote processor, a display screen described by the retrieved set of display data, only at the one or more times of day indicated by the scheduled time period as specified in the received set of transaction data.

9. A method of printing a coupon in a system including an interconnected host processor and remote processor, the method comprising the steps of:

storing in a memory of the remote processor a plurality of sets of data, including a plurality of sets of commands and a plurality of sets of transaction data, each set of transaction data corresponding to a transaction to be performed and specifying a set of commands and a scheduled time period during which printing of a coupon is authorized, and each set of commands describing the coupon to be printed and including instructions for printing the coupon, the scheduled time period indicating one or more times of day when the coupon can be printed at the remote processor;

sending, by the host processor to the remote processor, a set of data that is one of a set of commands and a set of transaction data;

receiving, by the remote processor, the set of data;

adding, by the remote processor, the received set of data to the plurality of sets of commands or the plurality of sets of transaction data already stored in the memory;

determining whether the set of data is a set of transaction data;

retrieving from the memory of the remote processor a set of commands from the plurality of sets of commands as specified by the received set of transaction data, when the received set of data is a set of transaction data; and printing, by the remote processor when the received set of data is a set of transaction data, a coupon described by the retrieved set of commands, only during the one or more times of day indicated by the scheduled time period as specified in the received set of transaction data.

10. The method of claim 9, further comprising the steps of:

prior to the sending step, storing in the host processor addresses in the remote processor of the plurality of sets of data; and prior to the determining step, storing in the memory of the host processor a location in the remote processor of the sent set of data.

11. The method of claim 9, further including the steps of:

compacting the set of data, by the host processor, before the sending step, using one of a plurality of compaction methods most suited to the set of data; and decompacting the set of data, by the remote processor, after the receiving step.

12. A method of printing a coupon in a system including an interconnected host processor and remote processor, the method comprising the steps of:

storing in a memory of the remote processor a plurality of sets of commands, each set of commands describing a coupon to be printed and including instructions for printing the coupon;

receiving, by the remote processor, a set of transaction data corresponding to a transaction to be performed, the set of transaction data specifying one of the plurality of sets of commands and a scheduled time period during which a coupon may be printed, the scheduled time period indicating one or more times of day when the coupon can be printed at the remote processor;

retrieving from the memory of the remote processor the set of commands specified by the received set of transaction data;

printing, by the remote processor, a coupon described by the retrieved set of commands, only during the one or more times of day indicated by the scheduled time period as specified in the received set of transaction data.

13. A method of printing a coupon in a system including an interconnected host processor and remote processor, the method comprising the steps of:

storing in a memory of the remote processor a plurality of sets of commands, each set of commands describing a coupon to be printed and including instructions for printing the coupon;

sending, by the host processor, a set of commands, and a set of transaction data to the remote processor, the set of transaction data specifying one of the plurality of sets of commands and a scheduled time period during which a coupon may be printed, the scheduled time period indicating one or more times of day when the coupon can be printed at the remote processor;

receiving, by the remote processor, the set of commands and the set of transaction data;

storing the received set of commands in the memory of the remote processor;

storing the received set of transaction data in the memory of the remote processor;

retrieving from the memory of the remote processor the set of commands specified by the set of transaction data sent by the host processor;

printing, by the remote processor, a coupon described by the retrieved set of commands, only at the times of day indicated by the scheduled time period as specified by the received set of transaction data.

14. An apparatus for displaying a screen display in a system including an interconnected host processor and remote processor, the apparatus comprising:

means for storing in a memory of the remote processor a plurality of sets of data, including a plurality of sets of display data, a plurality of sets of commands, and a plurality of sets of transaction data, each set of display data describing a display screen, each set of commands specifying a set of display data and including a series of commands for controlling display of a display screen, and each set of transaction data corresponding to a transaction to be performed and specifying a set of commands and a scheduled time period to display a display screen, the scheduled time period indicating one or more times of day when the display screen will be displayed;

means for sending, by the host processor to the remote processor, a set of data that is one of a set of display data, a set of commands, and a set of transaction data;

means for receiving, by the remote processor, the set of data;

means for adding, by the remote processor, the received set of data to the plurality of sets of display data, the plurality of sets of commands, or the plurality of sets of transaction data already stored in the memory;

means for determining whether the received set of data is a set of transaction data;

means for retrieving from the memory of the remote processor a set of commands from the plurality of sets of commands as specified by the received set of transaction data, when the received set of data is a set of transaction data;

means for retrieving from the memory of the remote processor a set of display data from the plurality of sets of display data as specified by the retrieved set of commands, when the received set of data is a set of transaction data; and means for displaying, by the remote processor when the received set of data is a set of transaction data, a display screen described by the retrieved set of display data, only at the one or more times of day indicated by the scheduled time period as specified by the received set of transaction data.

15. An apparatus for printing a coupon in a system including an interconnected host processor and remote processor, comprising:

means for storing in a memory of the remote processor a plurality of sets of data, including a plurality of sets of commands and a plurality of sets of transaction data, each set of transaction data corresponding to a transaction to be performed and specifying a set of commands and a scheduled time period during which a coupon may be printed, and each set of commands describing the coupon to be printed and including instructions for printing the coupon, the scheduled time period indicating one or more times of day when the coupon can be printed at the remote processor;

means for sending, by the host processor to the remote processor, a set of data that is one of a set of commands and a set of transaction data;

means for receiving, by the remote processor, the set of data;

means for adding, by the remote processor, the received set of data to the plurality of sets of commands or the plurality of sets of transaction data already stored in the memory;

means for determining whether the set of data is a set of transaction data;

means for retrieving from the memory of the remote processor a set of commands from the plurality of sets of commands as specified by the received set of transaction data, when the received set of data is a set of transaction data; and means for printing, by the remote processor when the received set of data is a set of transaction data, a coupon described by the retrieved set of commands, only during the times of day indicated by the scheduled time period as specified by the received set of transaction data.

* * * * *